S. SEVERSON.
SLED BRAKE AND GUIDE.
APPLICATION FILED JUNE 25, 1909. RENEWED JAN. 31, 1911.
987,681.
Patented Mar. 21, 1911.
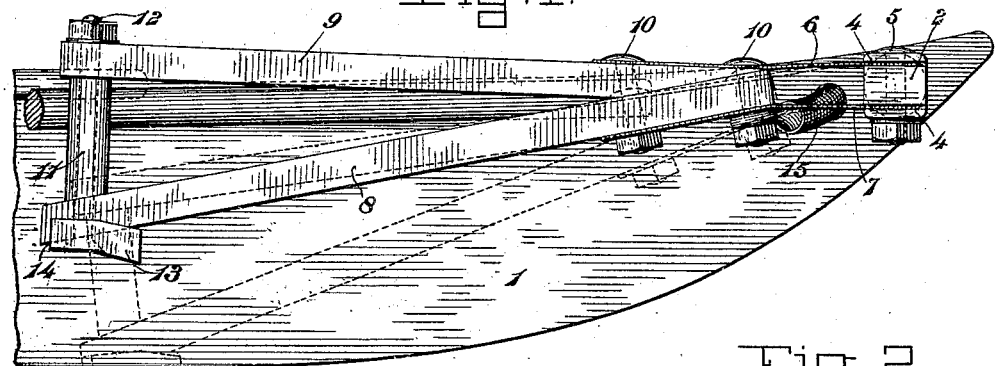
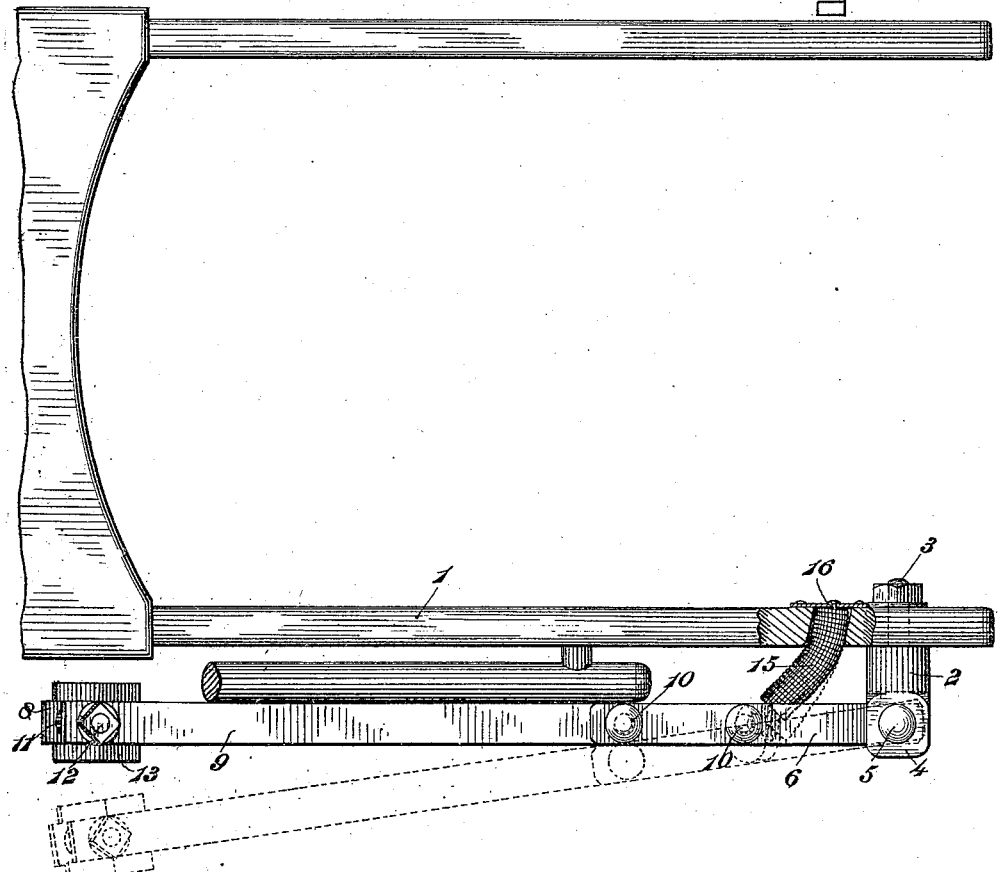

UNITED STATES PATENT OFFICE.

STEVEN SEVERSON, OF REPUBLIC, WASHINGTON.

SLED BRAKE AND GUIDE.

987,681. Specification of Letters Patent. Patented Mar. 21, 1911.

Application filed June 25, 1909, Serial No. 504,288. Renewed January 31, 1911. Serial No. 605,812.

*To all whom it may concern:*

Be it known that I, STEVEN SEVERSON, a citizen of the United States, residing at Republic, county of Ferry, and State of Washington, have invented certain new and useful Improvements in Sled Brakes and Guides, of which the following is a specification.

My invention relates to sled brakes and guides.

The object of the present invention is the provision of a sled brake and guide of novel construction adapting it for ready attachment to the runner of any sled in convenient position for manipulation by the person being carried by the sled so as to serve as a brake or as a guide, but which is normally adapted to lie alongside the sled runner and to be adapted for automatic return to such normal position after use.

The invention is set forth fully hereinafter and the novel features are recited in the appended claims.

In the accompanying drawings:—Figure 1 is a side view, full lines showing the brake in normal position and dotted lines showing it in depressed position; and Fig. 2, a plan view, full lines showing the brake in normal position and dotted lines in position for guiding the sled.

The runner of an ordinary sled is shown at 1, to the forward part of which, at any desired height, the sled brake and guide is connected by a head 2 which is preferably secured by a bolt 3 so as to be incapable of turning.

Pivotally secured in kerfs 4 in the head 2 by virtue of the employment of a bolt 5, are the leaf-springs 6 and 7 by which the brake-arm 8 is connected to the head, said brake-arm and a hand-piece 9 being secured by bolts 10 to the leaf-springs 6 and 7 and being mutually braced by a cross-piece 11 through which passes a bolt 12 which holds the brake-shoe 13 in a seat 14 in the arm 8.

A coil spring 15, which is secured to one of the bolts 10 and to the runner at 16, constitutes a means for returning the brake and guide to the side of the runner and for normally keeping it in that position, the leaf-springs 6 and 7 retaining the device in normal horizontal position with the shoe 13 disposed somewhat above the surface of the ground.

On depressing the hand-piece 9 to a suitable extent, the shoe 13 is brought into contact with the ground and can be forced as deep as desired to regulate the braking action. By virtue of the pivotal connection between the leaf-springs 6 and 7 and the bolt 5, the brake and guide may be swung outwardly to any desired extent and used as a guide to control the movements of the sled, so that the device is capable of use at the same time both as a brake and as a guide.

Having thus described my invention, what I claim as new and desire to secure by Letters Patent, is:—

1. In a combined sled brake and guide, the combination with the sled, of a combined brake and guide pivoted for lateral movement in relation to the sled, and a spring for retracting said combined brake and guide laterally toward the sled.

2. In a combined sled brake and guide, the combination with the sled runner, of a combined brake and guide disposed alongside the runner and movably connected at its forward part to said runner, its rear part being free to be swung outwardly or inwardly and upwardly or downwardly in relation to the runner.

3. In a combined sled brake and guide, the combination with the sled runner, of a combined brake and guide disposed alongside the runner and movably connected at its forward part to said runner, its rear part being free to be swung outwardly or inwardly and upwardly or downwardly in relation to the runner, and spring means for retracting said brake and guide laterally and upwardly.

4. In a combined sled brake and guide, the combination with the sled, of a combined brake and guide supported from the sled by a leaf-spring for up and down movement and pivoted for lateral movement, and a spring for laterally retracting the combined brake and guide.

In testimony whereof, I hereunto affix my signature in presence of two witnesses.

STEVEN SEVERSON.

Witnesses:
  JAY N. WHITE,
  JOHN STANLEY.

---

Copies of this patent may be obtained for five cents each, by addressing the "Commissioner of Patents, Washington, D. C."